(12) United States Patent
Wong et al.

(10) Patent No.: US 7,636,753 B2
(45) Date of Patent: *Dec. 22, 2009

(54) METHODS AND SYSTEMS FOR CONTROLLING ACCESS TO PRESENCE INFORMATION ACCORDING TO A VARIETY OF DIFFERENT ACCESS PERMISSION TYPES

(75) Inventors: Leon Chih Wen Wong, Redmond, WA (US); Sudhanshu M. Aggarwal, Bellevue, WA (US); Peter L. Beebee, Acton, MA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/974,500

(22) Filed: Oct. 27, 2004

(65) Prior Publication Data

US 2005/0086302 A1 Apr. 21, 2005

Related U.S. Application Data

(63) Continuation of application No. 09/729,573, filed on Dec. 4, 2000, now Pat. No. 6,839,735.

(60) Provisional application No. 60/186,255, filed on Feb. 29, 2000.

(51) Int. Cl.
*G06F 15/16* (2006.01)

(52) U.S. Cl. ........................ 709/204; 709/217; 709/223; 709/224; 709/228; 709/229; 709/205

(58) Field of Classification Search ......... 709/204–207, 709/223–225, 227, 228, 217, 229
See application file for complete search history.

(56) References Cited

U.S. PATENT DOCUMENTS 5,974,446 A * 10/1999 Sonnenreich et al. ....... 709/204
5,990,887 A * 11/1999 Redpath et al. ............. 709/204

(Continued)

OTHER PUBLICATIONS

Boyer, David G., Handel, Mark J., Herbsleb, James, "Virtual Community Presence Awareness," ACM SIGGROUP Bulletin, vol. 19, Issue 3, ACM Press, Dec. 1998, pp. 11-14.*

(Continued)

*Primary Examiner*—Dohm Chankong
(74) *Attorney, Agent, or Firm*—Merchant & Gould P.C.

(57) ABSTRACT

Methods and systems are described for controlling access to presence information using a plurality of different access permission types. Presence information is maintained over a computer network and describes availability of computers and associated users over that network. For example, instant messaging applications often involve maintaining presence information. Users control access to presence information using a number of different access permission types such as the right to view accurate presence information, the right to view any presence information, or the right to act on accessed presence information. By using several different access permission types, the present invention enables finer control over access to presence information.

24 Claims, 6 Drawing Sheets

U.S. PATENT DOCUMENTS

| | | | |
|---|---|---|---|
| 6,260,148 B1 * | 7/2001 | Aggarwal et al. | 726/14 |
| 6,301,609 B1 * | 10/2001 | Aravamudan et al. | 709/207 |
| 6,430,567 B2 * | 8/2002 | Burridge | 707/102 |
| 6,446,112 B1 * | 9/2002 | Bunney et al. | 709/204 |
| 6,463,471 B1 * | 10/2002 | Dreke et al. | 709/224 |
| 6,480,885 B1 * | 11/2002 | Olivier | 709/207 |
| 6,487,583 B1 * | 11/2002 | Harvey et al. | 709/204 |
| 6,519,639 B1 * | 2/2003 | Glasser et al. | 709/224 |
| 6,564,261 B1 * | 5/2003 | Gudjonsson et al. | 709/227 |
| 6,606,657 B1 * | 8/2003 | Zilberstein et al. | 709/224 |
| 6,677,968 B1 * | 1/2004 | Appelman | 715/853 |
| 6,697,840 B1 * | 2/2004 | Godefroid et al. | 709/205 |
| 6,750,881 B1 * | 6/2004 | Appelman | 715/733 |
| 6,839,735 B2 * | 1/2005 | Wong et al. | 709/204 |
| 6,847,969 B1 * | 1/2005 | Mathai et al. | 707/100 |
| 6,853,634 B1 * | 2/2005 | Davies et al. | 370/349 |
| 6,859,821 B1 * | 2/2005 | Ozzie et al. | 709/205 |
| 7,035,926 B1 * | 4/2006 | Cohen et al. | 709/225 |
| 7,171,473 B1 * | 1/2007 | Eftis et al. | 709/227 |
| 7,359,938 B1 * | 4/2008 | Davies et al. | 709/204 |
| 2002/0035594 A1 | 3/2002 | Dreke | |
| 2002/0065894 A1 * | 5/2002 | Dalal et al. | 709/206 |
| 2003/0101247 A1 * | 5/2003 | Kumbalimutt et al. | 709/227 |
| 2003/0217099 A1 * | 11/2003 | Bobde et al. | 709/202 |

OTHER PUBLICATIONS

Ackerman, Mark S.; and Starr, Brian, "Social Activity Indicators for Groupware," Computer Practices, IEEE, Jun. 1996, vol. 29, Issue 6, pp. 37-42.*

Goland, Y. et al., HTTP Extensions for Distributed Authoring—WEBDAV, Network Working Group—The Internet Society, Feb. 1999 (pp. 1-72).

* cited by examiner

METHODS AND SYSTEMS FOR CONTROLLING ACCESS TO PRESENCE INFORMATION ACCORDING TO A VARIETY OF DIFFERENT ACCESS PERMISSION TYPES

CROSS-REFERENCE TO RELATED APPLICATIONS

This application is a continuation of U.S. patent application Ser. No. 09/729,573 filed Dec. 4, 2000 now U.S. Pat. No. 6,839,735, which application claims the benefit of U.S. Provisional Application Ser. No. 60/186,255, filed Feb. 29, 2000, which applications are incorporated herein by reference in their entireties.

BACKGROUND OF THE INVENTION

1. The Field of the Invention

The present invention relates to the field of electronic communication. In particular, the present invention relates to methods and systems for controlling access to presence information according to a variety of different access permission types.

2. The Prior State of the Art

"Presence information" describes an availability status of a computer system or a user associated with that computer system. Presence information is useful in, for example, instant messaging in which electronic messages are rapidly communicated in a matter of seconds and often within a second. The rapid communication of instant messages facilitates real time electronic conversations among instant messaging participants. Therefore, instant messaging betters reflects the way people typically communicate over the phone or in person as compared to standard electronic mail.

One requirement for a real time conversation using instant messaging in that the participants be available for conversing. Presence information gives a participant a good idea on whether or not it would be beneficial to initiate or continue a conversation with another participant. For example, if the presence information for a given participant is "logged off", one might not bother composing an instant message for transmission to that participant since the participant is not able to receive the instant message due to a disconnection from its instant messaging server. On the other hand, if the presence information for a given participant is "logged in", one might venture to compose and transmit an instant message since the participant will likely receive the instant message in real time. Whether or not there is a response to the instant message depends on whether or not the receiving participant is present at his/her computer and whether or not that participant chooses to respond. However, the presence information at least gives the sender the knowledge that the instant message will likely be received by the receiving participant's computer system in real time. The presence information may give much more information regarding availability than whether the user's computer system is logged in or logged out. For example, the presence information might include "idle" indicating that even though the user is logged in, the user has not used the computer system for a while. Thus, a sender might conclude that even though the receiving computer system would receive the instant message in real time, that the user of the receiving computer system is not currently present at the computer system. Thus, the sender may elect not to compose and send an instant message since a real time reply is not likely. Other types of presence information might include, for example, "out to lunch" or "out, will be back at 3:00 pm" and so forth.

Instant messaging is but one application in which presence information may be useful. Presence information might also be useful in office tracking software which tracks whether or not employees are available. If an employee is seen as not available, someone trying to contact the person might not bother to travel to the office of that employee or place a phone call to the employee.

It may often be desirable to control access to presence information. For example, a participant might not want someone else to know whether or not the individual is logged in or out to lunch. Thus, one might want to prohibit other individuals from viewing such presence information. Conventional systems for controlling access to presence information are limited in the sense that they only allow a user to control access in one particular way. Specifically, a user may simply be granted or denied the right to view presence information. Therefore, what are desired are methods and systems for controlling access to presence information according to a variety of different access permission types.

SUMMARY OF THE INVENTION

The present invention relates to methods and systems for controlling access to presence information using a number of different access permission types. Presence information is maintained over a computer network and describes availability of computers and associated users over that computer. For example, presence information may describe the availability of a computer using terms such as "logged in", "logged out", "active", "idle" and the like. The presence information may also describe the availability of a user associated with that computer using terms such as "out to lunch", "out of the office", "back at 3:00 pm" and the like. This presence information is useful in any application where the availability of a computer or a user associated with that computer is helpful. For example, in instant messaging, communication back and forth between users occurs quickly. If a user were not available to communicate in this fashion, there would often be no sense in sending an instant message to that user. Thus, instant messaging applications often involve maintaining presence information.

It may be desirable for a user to control who has access to presence information. For example, a user whose computer is "logged in" may not want others to know that the user is "logged in". Conventional ways of controlling access to presence information involve simply granting or denying the right to view presence information. However, the principles of the present invention allow for much finer control over the access to presence information. Specifically, the users are allowed to control access to presence information using a number of different access permission types. These types might include a permission to view presence information whether accurate or not, permission to view accurate presence information, permission to act on accessed presence information and so forth. The permission to act on accessed presence information might include permission to send messages to the user associated with the accessed presence information and the like.

By using several different access permission types, the present invention enables finer control over access to presence information. For example, a user may grant the right to access presence information whether accurate or not, but deny the right to access accurate presence information. Thus, a user may indicate that the associated computer is "logged out" when, in fact, that is actually not the case. Other users may not ever even know that they are viewing inaccurate presence information. An embodiment of a method in accordance with the present invention works as follows.

An "owner" client computer system creates a request including an instruction to change an access permission status applicable to some or all of the other client computer systems network connected to the owner client computer system. This access permission status may be a right to view accurate presence information, a right to view any presence information, a right to act on the presence information and the like. The owner client computer system then transmits this request to a server computer system that maintains the presence information for the client computer systems.

Once, the server computer system receives this request, the server computer system sets an entry in a data field that represents the changed access permission status. Subsequently, when other client computer systems request a certain kind of access to the presence information, the server computer system will use the entry to determine whether or not that access should be granted.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to both methods and systems for controlling access to presence information. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
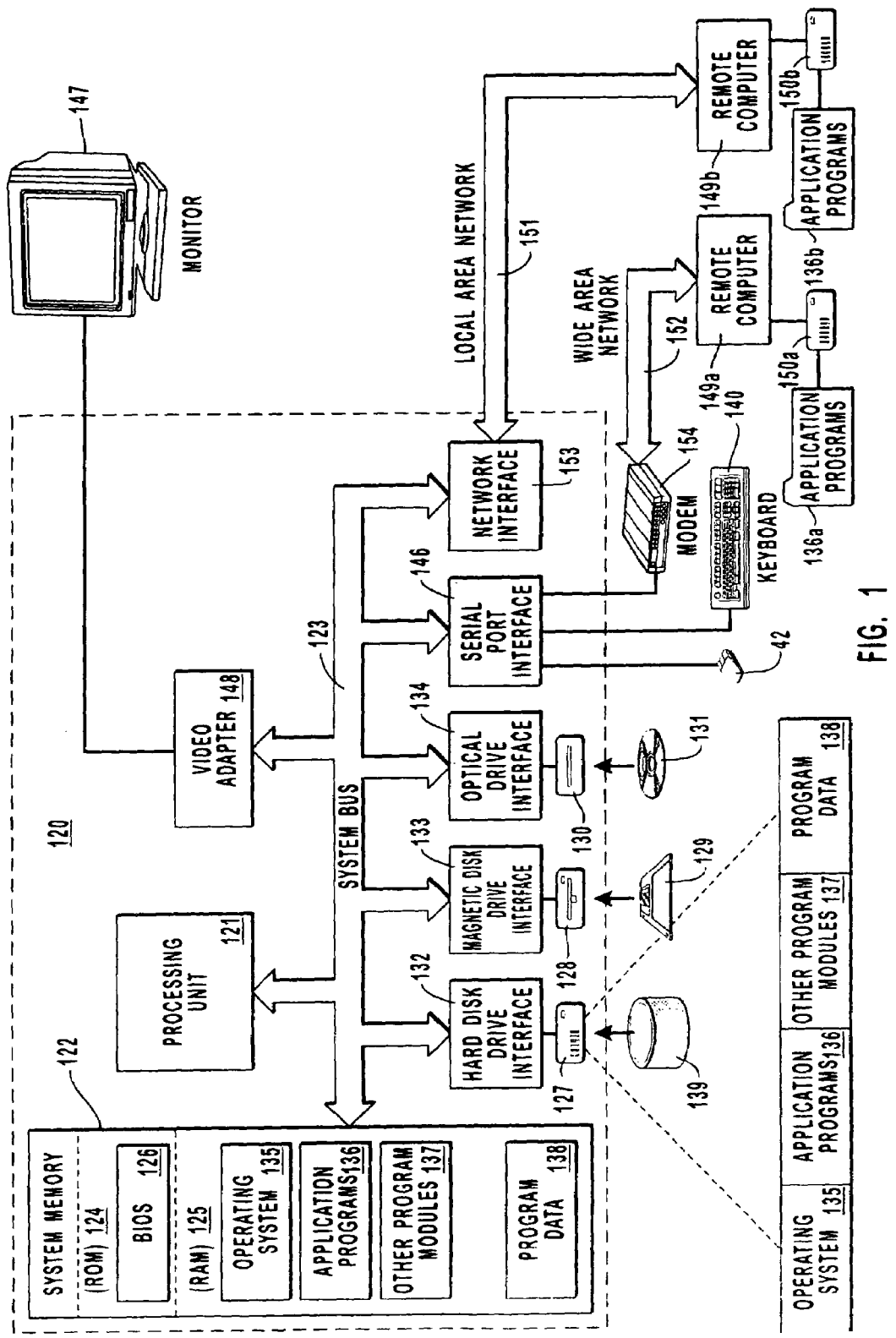
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are 1 1 connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
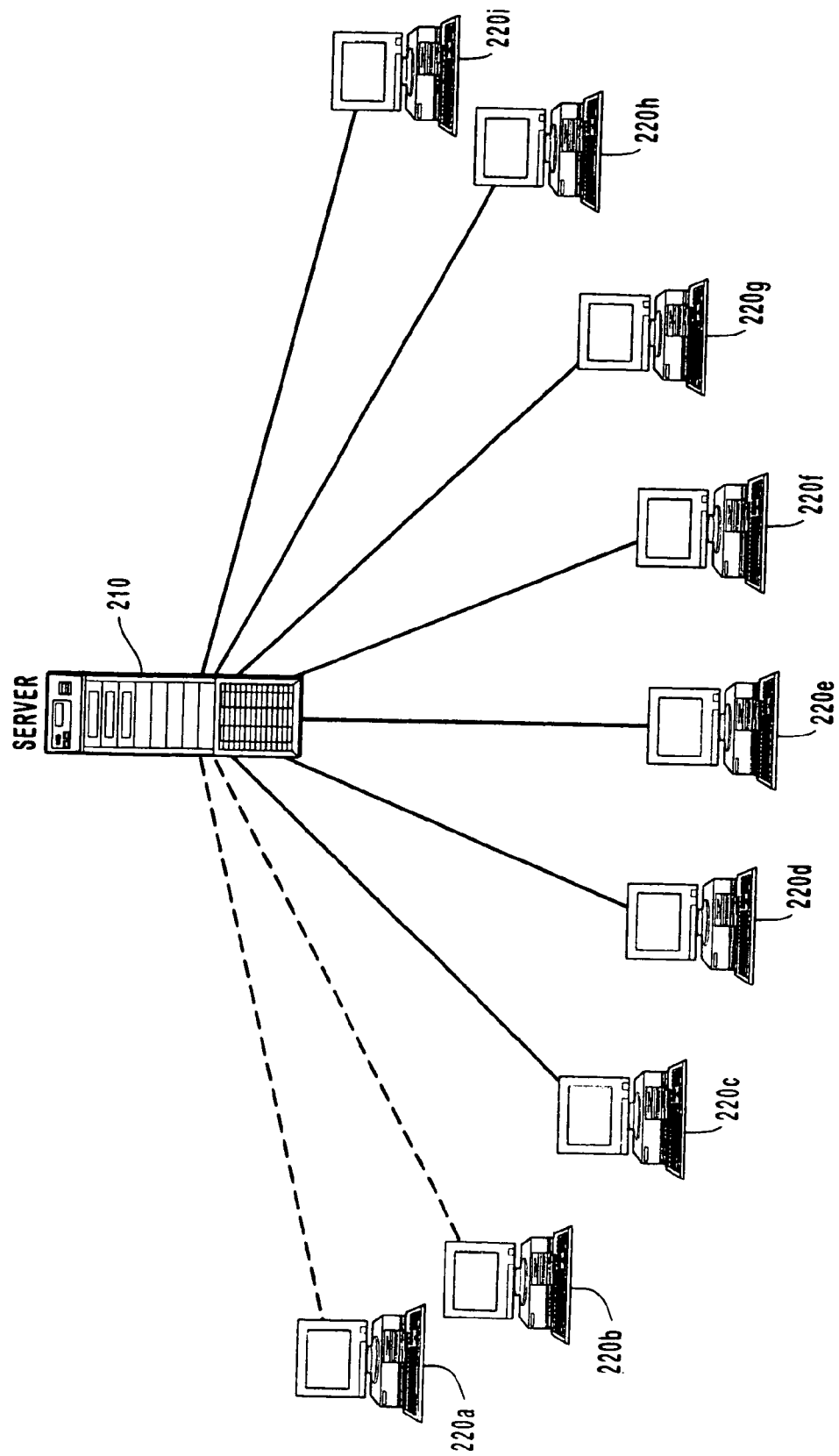
FIG. 2 is illustrates in more detail a networked computer that may be used in the operating environment of FIG. 1.

FIG. 2 illustrates a suitable network in which the present invention may operate and will be referred to frequently in describing embodiments of the present invention. The network includes a server computer system 210 that is network connectable to a plurality of client computer systems 220 including nine client computer systems 220a through 220i. Each of the server computer systems 210 and the client computer systems 220a through 220i may be structured as described above for the computer 120 of FIG. 1 and include some or all of the components described as being included in the computer 120. However, many other computer devices may be used as the server computer system and client computer systems so long as they are consistent with the principles of the present invention as described herein.

In order to facilitate a clear understanding of the principles of the present invention, certain terms are hereinafter defined which are to be applied throughout this description and in the following claims.

In this description and in the following claims, a "client computer system" is defined as a computer or group of computers that use the services of another computer system. A "server computer system" is defined as a computer or group of computers that provides services to another computer system. A "computer" is defined as any device capable of processing data such as a personal computer, a personal digital assistant, and the like.

Note that a computer system may use the services of another computer system and yet still provide services to yet other computer systems. Thus, a client computer system in one context may also be a server computer system in another context. Similarly, a server computer system in one context may also be a client computer system in another context. The use of the term "server computer system" for computer system 210 and "client computer system" for computer systems 220a through 220i is intended in the context of maintaining presence information. In other words, the computer system 210 is a server computer system because it serves by maintaining presence information. The computer systems 220a through 220i are client computer systems because they are served by the server computer system 210 maintaining presence data. The use of the term "server computer system" for the server computer system 210 is not intended to imply that the server computer system 210 cannot also be a client computer system in a different context. Similarly, the use of the term "client computer system" for the client computer systems 220a through 220i is not intended to imply that the client computer systems cannot also be server computer systems in a different context.

In this description and in the following claims, "network connected" means having a connection either directly or indirectly through one or more networks. The solid line connecting each of client computer systems 220c through 220i to the server computer system 210 represents that these client computer systems are network connected to the server computer system 210. The dashed line connecting each of client computer systems 220a and 220b to the server computer system 210 represents that these client computer systems are not currently network connected to the server computer system 210 but are network connectable to the server computer system 210. In this description and in the claims, "network connectable" means having the ability to connect either directly or indirectly through one or more networks. The server computer system 210 maintains presence information regarding each of the plurality of client computer systems 220. In this description and in the claims, "presence information" concerning a given client computer system means information that describes the availability of a client computer system or a user of that client computer system. For example, "logged in" or "logged out" may describe whether the client computer system is network connected or not.

Figure 3:
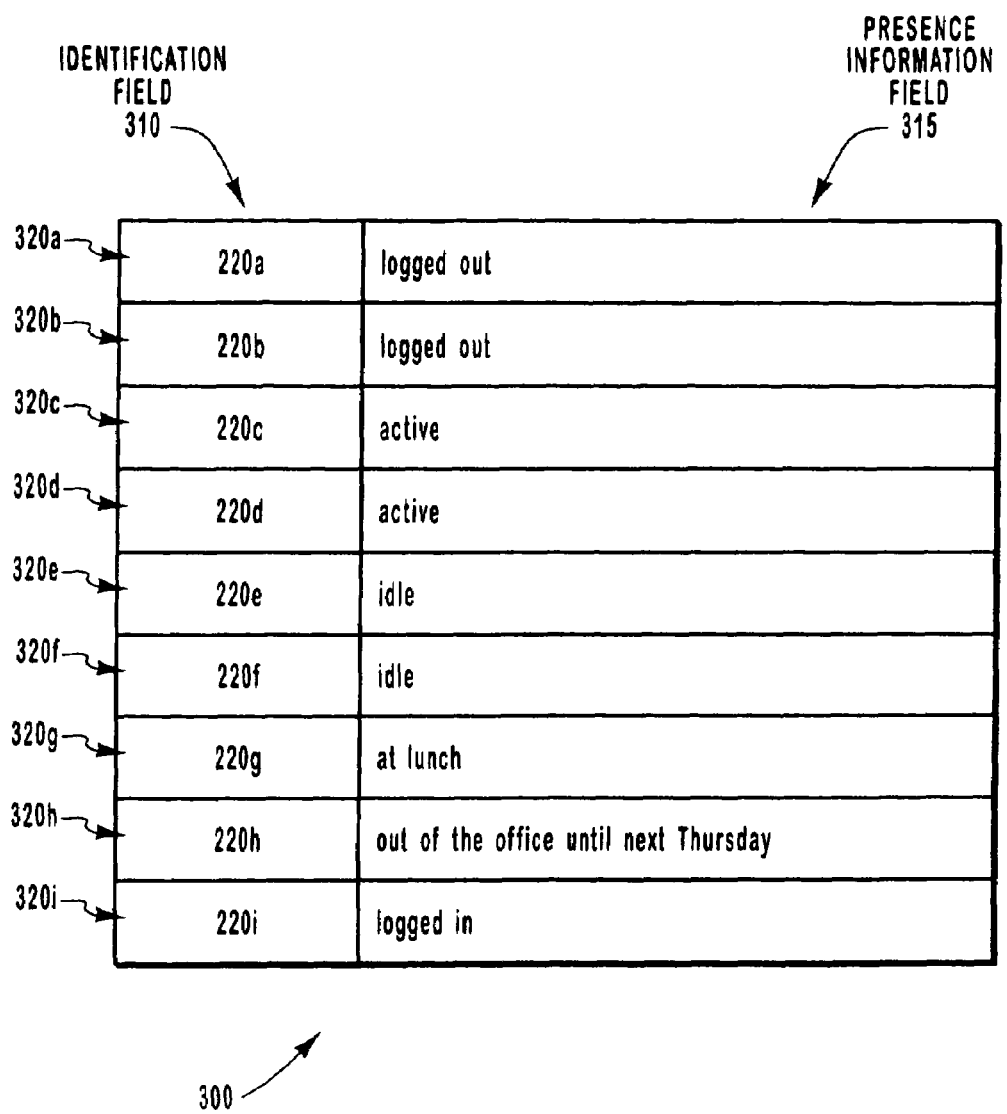
FIG. 3 illustrates a data structure that illustrates the type of presence information that the server system of FIG. 1 may maintain.

FIG. 3 illustrates a data structure 300 that maintains presence data regarding each of the client computer systems 220a through 220i that are accessible by the server computer system 210. The data structure 300 includes a row entry 320a through 320i for each client computer system 220a through 220i. For each client computer system 220a though 220i, the data structure includes an identification field 310 that identifies the client computer system and a presence information field 315 that identifies presence information describing the availability of that client computer system.

For example, as described above, the client computer systems 220a and 220b are not network connected to the server computer system 210. Therefore, the data structure 300 indicates that client computer systems 220a and 220b are "logged out." Since the client computer system 220i is network connected to the server computer system 210, the data structure 300 indicates that client computer system 220i is "logged in." Since, as described above, the client computers 220c through 220h are network connected to the server computer system 210, the data structure 300 might indicate that those client computer systems are also "logged in." However, the data structure 300 indicates more detailed presence information regarding the availability of those "logged in" client computer systems 220c through 220h.

For example, the data structure 300 indicates that the client computer systems 220c and 220d are "active" meaning that a user has used the computer so recently that the user is likely still at the computer. The data structure 300 also indicates that the client computer systems 220e and 220f are "idle" meaning that a user has not recently used the computer making it less likely that the user is at the computer. The presence information might also include information regarding the whereabouts of the user. For example, client computer system 220g is "at lunch" while the client computer system 220h is "out of the office until next Thursday."

The structure of FIGS. 1, 2 and 3 represents a system in which the present invention may operate. Although the server computer system 210 is network connectable to nine client computer systems in FIG. 2, the server computer system 210 may be network connectable to more or less than nine client computer systems. Furthermore, the server computer system 210 may be connected to other server computer systems. In one example operating environment, the server computer system 210 is part of the constellation of computer systems that form the Internet.

Figure 4:
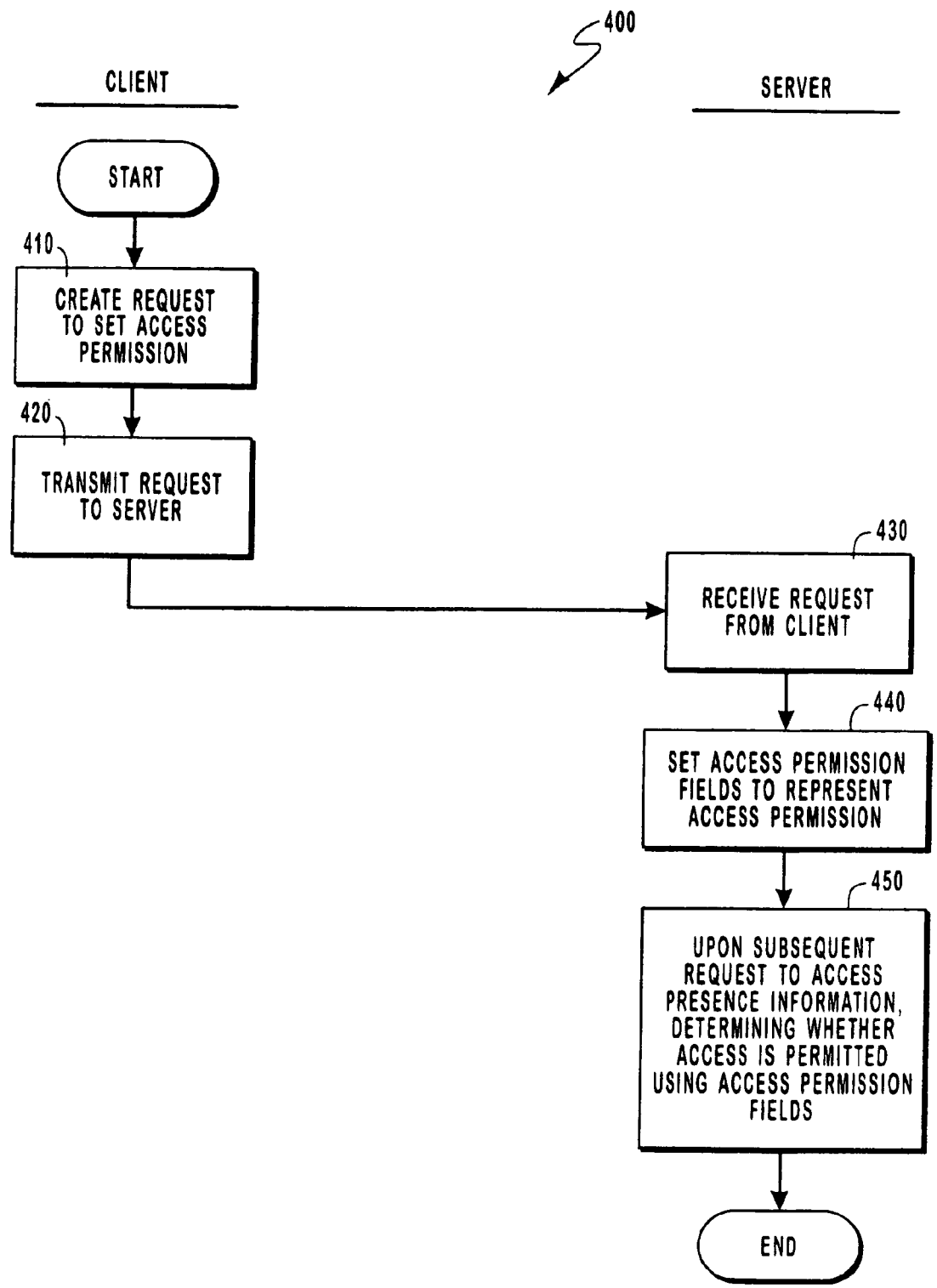
FIG. 4 illustrates a flowchart of a method of controlling access to the presence information.

FIG. 4 illustrates a method 400 for controlling access to presence information in accordance with the present invention. The method of FIG. 4 will be described with frequent reference to FIG. 2 and occasional reference to FIG. 3. In the example, the client computer system 220i of FIG. 2 controls access to some of the presence information stored in the data structure 300 of FIG. 3. In that sense, the client system 220i is the owner of that presence information. In the example described with reference to FIG. 4, the client computer system 220i has the ability to control access to the presence information that describes its own availability (the availability of the client computer system 220i).

In the method of FIG. 4, acts performed exclusively by the owner client computer system such as the client computer system 220i are listed directly below the heading "CLIENT" on the left-hand side of FIG. 4. Acts performed exclusively by the server computer system that maintains the presence information are listed directly below the heading "SERVER" on the right-hand side of FIG. 4.

Referring to FIG. 4, the owner client computer system creates a request that includes an instruction to set or change an access permission status (act 410) enforceable against at least a subset of the plurality of client computer systems 220 when those client computer system attempt to access the presence information of the owner client computer system. The request may set or change a variety of different access permission types. In this description and in the claims, the term "access permission type" means a way of limiting or granting access to presence information. For example, three types of access permission types which will be now be explained in further detail are entitled "presence", "subscriptions" and "send-to".

The "presence" access permission type may be used to control who can view accurate presence information. A participant who has "presence" access permission for the presence information associated with the owner client computer system 220i will thus be able to see that the owner client computer system 220i is "logged in". A participant who does not have such "presence" access permission will be unable to view accurate presence information regarding the owner client computer system 220i. A response to a request for such information from an unauthorized participant might include, for example, a deny message indicating that permission to view is denied, or may include inaccurate response information. For example, the unauthorized participant may view that the owner client computer system 220i is "logged out" even though the system 220i is actually "logged in".

Figure 5:
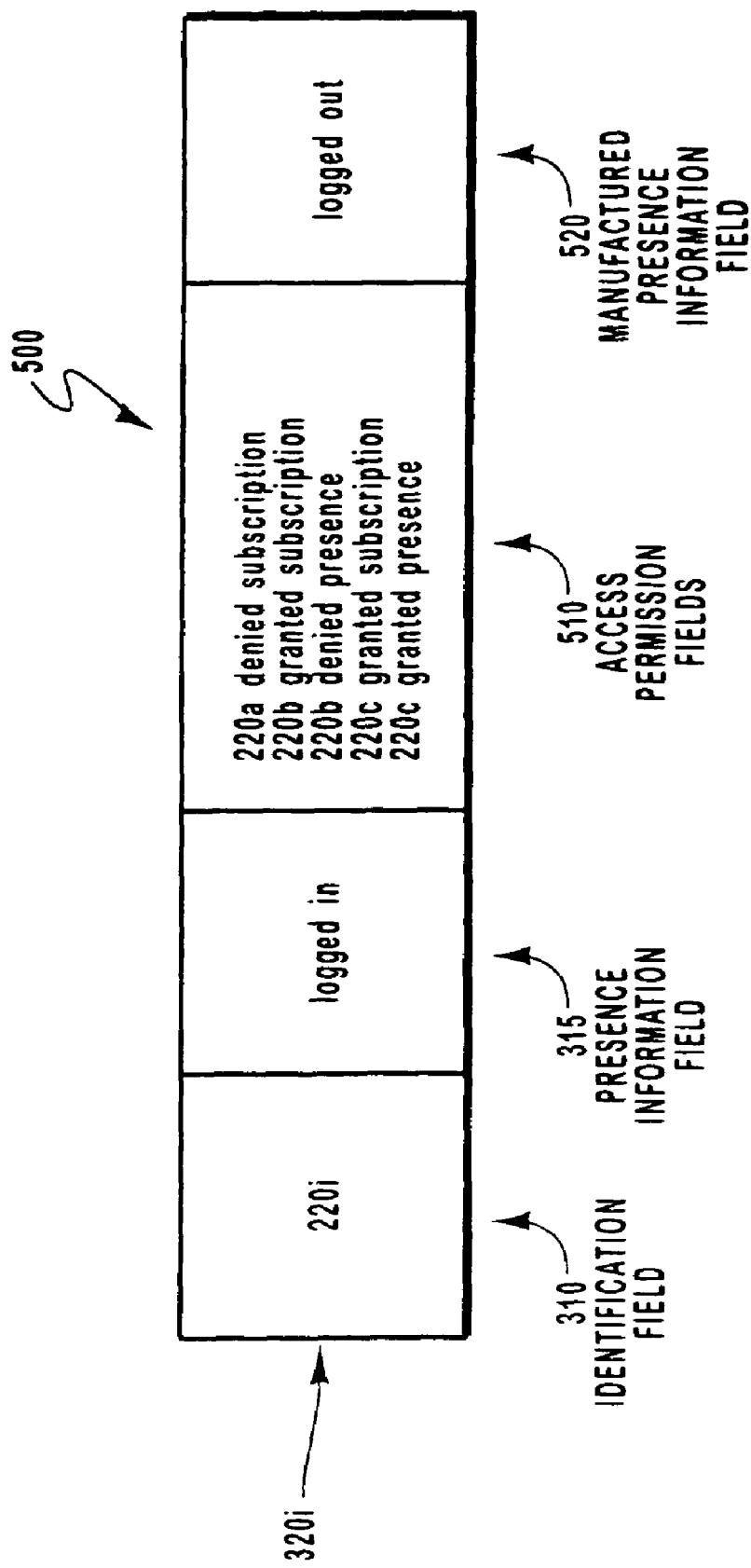
FIG. 5 illustrates in detail an extended data structure including access permissions for the owner client computer system.

The "subscription" access permission type may be used to control who can view presence information, whether accurate or not. FIG. 5 illustrates an extended data structure 500 for the owner client computer system 220i that will be used to describe the distinction and interrelation between the "presence" and "subscription" access permission types. The extended data structure 500 is shown only for the owner client computer system 220i although the other client computer systems 220a through 220h may have similar data structures. The extended portion of the data structure 500 includes access permission fields 510 that represent who is granted or denied what kind of access to the presence information.

For example, the access permission fields 510 indicate that client computer system 220a is denied "subscription" access permission to the presence information for the owner client computer system 220i. Also, the client computer system 220b is granted "subscription", but denied "presence" access permission. The client computer system 220c is granted "subscription" and "presence" access permission.

The client computer system 220a would be unable to view presence information regarding the owner client computer system 220i whether that presence information is real or manufactured since "subscription" access permission is denied. Also, the denied subscription permission would prevent the client computer system 220a from receiving notifications when the presence information for the owner client computer system 220i changes. Client computer systems 220b and 220c will be able to view some kind of presence information since they have "subscription" access permission. However, client computer system 220b is denied "presence" access permission thereby denying the right to view accurate presence information. Thus, client computer system 220b will be able to view the manufactured presence information represented in the manufactured presence information field 520 of the extended data structure. In other words, client computer system 220b would perceive the owner client computer system 220i as being "logged out" when, in fact, the owner client computer system is "logged in".

The client computer system 220c has "presence" access permission and thus would be able to view the accurate presence information indicating that the owner client computer system 220i is "logged in".

The "send-to" access permission type may be used to control who can send messages to the owner client computer system using the accessed presence information. For example, someone who does not have "sent-to" access permission status may be able to view the presence information of the owner client computer system, but will not be allowed to send messages using that presence information even though it indicates that the owner client computer system is "logged in" or "active". In particular, the "notify method" described in the WEBDAV GENA (General Notifications) protocol may be used to send the messages using accessed presence information.

Figure 6:
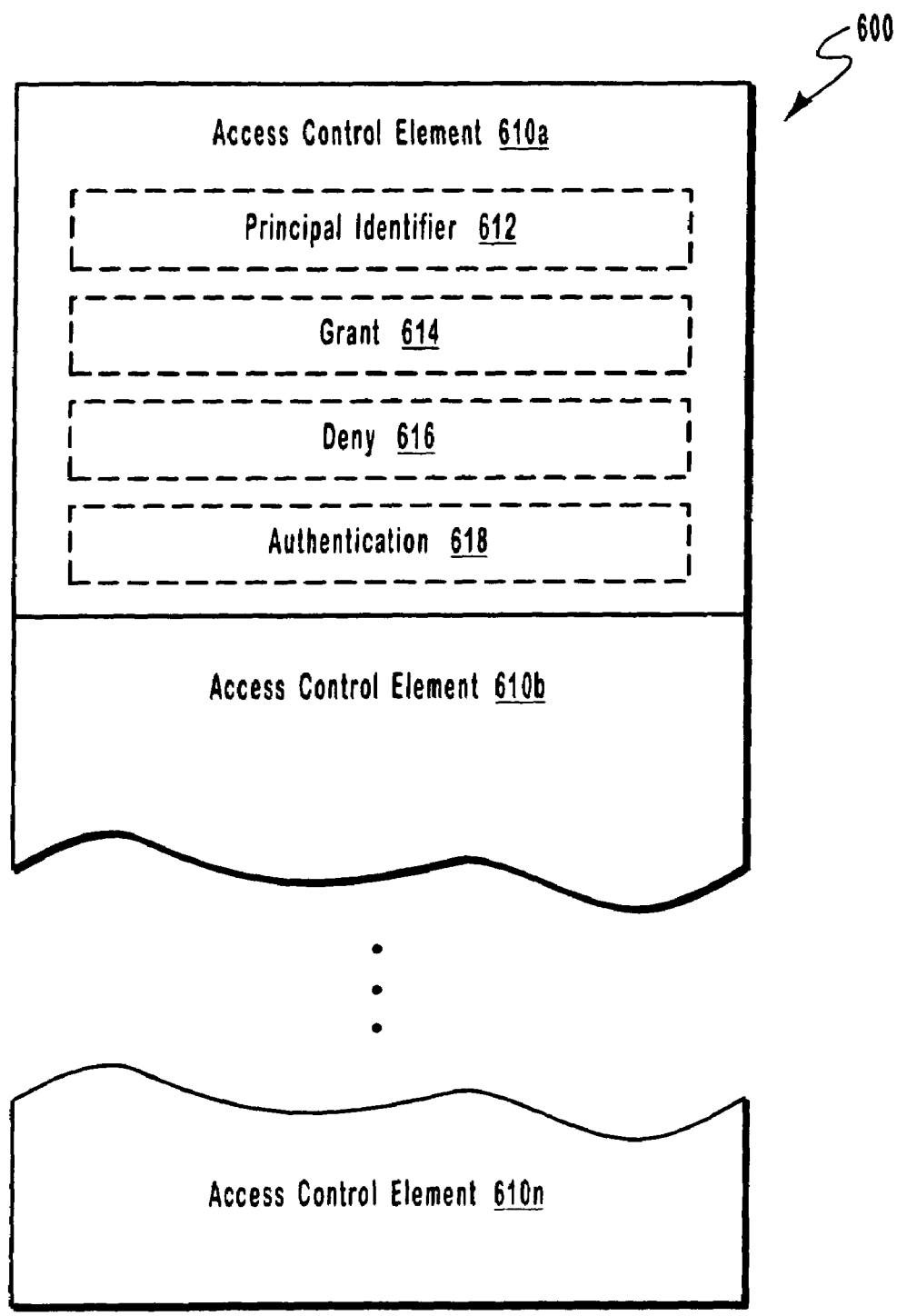
FIG. 6 illustrates in detail a data structure of a request that includes an instruction to control access to presence information.

FIG. 6 illustrates a data structure 600 of a request to set or change the access permission status. The data structure includes one or more access control element fields 610a through 610n. Each access control element field may include a principle identifier field 612 that identifies the entity on which the access permission is to be enforced, a grant field 614 that identifies any access permission types granted to that entity, a deny field 616 that identifies any access permission types denied to that entity, and possibly an authentication field 618 that identifies the authentication types used to authenticate the entity. Although these fields 612, 614, 616 and 618 are shown for the first access control element field 610, the other access control elements fields may each include similar fields.

The data structure 600 of the request may include an extensible Markup Language (XML) element that indicates the access permission type being denied or granted and to whom that access is denied or granted. Take the following XML element as an example.

```
<?xml version="1.0"?>
<a:rvpacl xmlns:a="http://schemas.microsoft.com/rvp/acl/">
    <a:acl>
        <a:inheritance>none</a:inheritance>
        <a:ace>
            <a:principal>
                <a:rvp-principal>
                    http://im.example.com/instmsg/aliases/220b/
                </a:rvp-principal>
                <a:credentials>
                    <a:assertion/>
                    <a:digest/>
                    <a:ntlm/>
                </a:credentials>
            </a:principal>
            <a:grant>
                <a:subscription/>
            </a:grant>
            <a:deny>
                <a:presence/>
            </a:deny>
        </a:ace>
    </a:acl>
</a:rvpacl>
```

In this XML element, the portion between <a:ace> and </a:ace> defines an Access Control Element (ACE) that defines access permissions. This portion would correspond to the access control element field 610a shown in FIG. 6. The portion of the access control element that occurs between <a:rvp-principal> and </a:rvp-principal> defines the entity to whom the access permission is to apply (corresponds to the principal identifier field 612 of FIG. 6). In the above example request, the Uniform Resource Locator (URL) corresponding to the entity is "http://im.example.com/instmsg/aliases/220b/" which represents client computer system 220b. More specifically, the URL represents the user account on the presence information server (e.g., an instant messaging server) that the corresponding user using the client computer 220b is logged into. The portion of the access control element that occurs between <a:credentials> and </a:credentials> describes authentication mechanisms that may be used to authenticate the client computer system 220b when requesting access to presence information (corresponds to the authentication field 618 of FIG. 6). The portion of the access control element between <a:grant> and </a:grant> describes the types of access permission granted (corresponds to the grant field 614 of FIG. 6). In this example, client computer system 220b is granted "subscription" access permission. The portion of the access control element between <a:deny> and </a:deny> describes the types of access permission denied (corresponds to the deny field 616 of FIG. 6). In this example, client computer system 220b is denied "presence" access permission.

Once the owner client computer system generates the request to set or change access permission to the presence information (act 410), the owner client computer system then transmits the request to the server computer system (act 420). For example, the owner client computer system 220i may transmit to the server computer system 210 the request to grant "subscription" and deny "presence" access permission to the client computer system 220b.

Once the request is received at the server computer system (act 430), subsequent requests for accessing the presence information will result in the server computer system determining whether or not to allow access to the presence information based on the request to set or change the access permission status. Accordingly, embodiments within the scope of the present invention include a means or step for determining whether or not to allow access to the presence information based on the request to set or change the access permission status.

In one embodiment, the server computer system sets the access permission fields 510 within the extended data structure 500 to represent the new access permissions (act 440). Then, upon receiving subsequent requests to access the presence information, the server computer system determines whether or not to grant the requested access based on the access permission fields 510 within the extended data structure 500 (act 450).

The above describes methods and systems for controlling access to presence information using a plurality of access permission types. Since many different access permission types may be set, the present invention permits for fine grain control over what kind of access to the presence information is permitted.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method in a computer system for controlling access to presence information of a first computer system, wherein the presence information comprises at least a first indication of an availability of the first computer system and a second indication of an availability associated with a user of the first computer system, the method comprising:

receiving from a first computer system a request to set access permission for a second computer system to access the presence information of the first computer system, the access permission indicating whether the second computer system has subscription access permission and whether the second computer system has presence access permission; and setting the subscription access permission and the presence access permission according to the request received from the first computer system;

receiving a request from the second computer system to subscribe to the presence information of the first computer system;

determining whether the second computer system has subscription access permission to the first computer system;

when the second computer system does not have the subscription access permission, sending a response to the second computer system denying the request to subscribe to the presence information of the first computer system;

when the second computer system has the subscription access permission, determining whether the second computer system has the presence access permission to the first computer system;

when the second computer system has the presence access permission to the first computer system, providing to the second computer system accurate presence information of the first computer system; and when the second computer system does not have the presence access permission, computing always manufacturing inaccurate presence information of the first computer system based on and contrary to different from the accurate presence information of the first computer system, and providing to the second computer system the computed manufactured inaccurate presence information, wherein the manufactured inaccurate presence information comprises information that indicates the user of the first computer system has not recently used the first computer system when the user has recently used the computer system.

2. The method of claim 1 wherein the computer system that controls access to the presence information is a server computer system and the first computer system and the second computer system are client computer systems.

3. The method of claim 2 wherein the server computer system sets the access permission based on receiving an indication of the access permission from the first computer system.

4. The method of claim 2 wherein the server computer system provides to the second computer system accurate presence information based on receiving an indication of presence information from the first computer system.

5. The method of claim 1 wherein receiving the request to set the access permission for the second computer system further indicates whether the second computer system has restricted ability to act on the presence information.

6. The method of claim 5 wherein the restricted ability prohibits the second computer system from sending messages to the first computer system.

7. The method of claim 1 wherein the first computer system and the second computer system communicate via instant messaging.

8. The method of claim 1 further comprising:
manufacturing the inaccurate presence information of the first computer system based on the accurate availability of the user of the first computer system.

9. The method of claim 8 wherein the manufactured inaccurate indication is one of a plurality of predetermined plausible responses.

10. The method of claim 1 wherein the inaccurate presence information inaccurately indicates the whereabouts of the user of the first computer system.

11. The method of claim 1 wherein the inaccurate presence information indicates that the first computer system is idle when the first computer system is active.

12. A computer-readable storage medium containing instructions for causing a server computer system to control access to presence information of a first computer system, wherein the presence information comprises at least a first indication of an availability of the first computer system and a second indication of an availability associated with a user of the first computer system, by a method comprising:

receiving from setting by a user of the first computer system a request to set access permission for a second computer system to access the presence information of the first computer system, the access permission indicating whether the second computer system has subscription access permission and, when the second computer system has subscription access permission, whether the second computer system has presence access permission;

upon receiving a request from the second computer system to subscribe to the presence information of the first computer system, determining whether the access permission indicates that the second computer system has the subscription access permission;

when the second computer system does not have the subscription access permission, sending a response to the second computer system denying the request to subscribe to the presence information of the first computer system;

when the second computer system has the subscription access permission, determining whether the second computer system has the presence access permission; and when the second computer system does not have the presence access permission, computing always manufacturing inaccurate presence information of the first computer system based on and contrary to different from the accurate presence information, and providing to the second computer system the manufactured inaccurate presence information, wherein the manufactured inaccurate presence information comprises information that indicates the user of the first computer system has not recently used the first computer system when the user has recently used the computer system.

13. The computer-readable storage medium of claim 12 wherein the method further comprises providing the second computer system with accurate presence information of the first computer system when the second computer system has presence access permission.

14. The computer-readable storage medium of claim 12 wherein the server computer system provides to the second computer system accurate presence information based on receiving an indication of changed presence information from the first computer system.

15. The computer-readable storage medium of claim 12 wherein receiving the request to set the access permission for the second computer system further indicates whether the second computer system has restricted ability to act on the presence information of the first computer system.

16. The computer-readable storage medium of claim 15 wherein the restricted ability prohibits the second computer system from sending messages to the first computer system.

17. The computer-readable storage medium of claim 12 wherein the first computer system and the second computer system communicate via instant messaging.

18. A computer system for maintaining presence information and exercising control of access to the presence information, wherein the presence information comprises at least a first indication of an availability of the first computer system and a second indication of an availability associated with a user of the first computer system, comprising:

a component that sets access permission for a second computer system to access the presence information of the first computer system, the access permission specifiable by a user of the first computer system, the access permission indicating whether the second computer system has subscription access permission and whether the second computer system has presence access permission;

a component that receives a request from the second computer system to subscribe to the presence information of the first computer system;

a component that denies the request if the access permission indicates that the second computer system does not have the subscription access permission;

a component that determines whether the second computer system has the presence access permission if the access permission indicates that the second computer system has the subscription access permission;

a component that provides to the second computer system accurate presence information of the first computer system when the second computer system has presence access permission; and a component that computes always manufactures inaccurate presence information of the first computer system based on and different from the accurate presence information and provides to the second computer system the computed manufactured inaccurate presence information when the second computer system does not have presence access permission wherein the inaccurate presence information is contrary to the accurate presence information, wherein the manufactured inaccurate presence information comprises information that indicates the user of the first computer system has not recently used the first computer system when the user has recently used the computer system.

19. The system of claim 18 wherein the computer system that controls access to the presence information is a server computer system and the first computer system and the second computer system are client computer systems.

20. The system of claim 19 wherein the server computer system sets the access permission based on receiving an indication of the access permission from the first computer system.

21. The system of claim 19 wherein the server computer system provides to the second computer system accurate presence information based on receiving an indication of presence information from the first computer system.

22. The system of claim 18 wherein the component that sets access permission further indicates whether the second computer system has restricted ability to act on the presence information.

23. The system of claim 22 wherein the restricted ability prohibits the second computer system from sending messages to the first computer system.

24. The system of claim 18 wherein the first computer system and the second computer system communicate via instant messaging.

* * * * *